United States Patent
Zhamu et al.

(10) Patent No.: US 10,934,637 B2
(45) Date of Patent: Mar. 2, 2021

(54) PROCESS FOR PRODUCING FABRIC OF CONTINUOUS GRAPHENE FIBER YARNS FROM FUNCTIONALIZED GRAPHENE SHEETS

(71) Applicant: Nanotek Instruments, Inc., Dayton, OH (US)

(72) Inventors: Aruna Zhamu, Springboro, OH (US); Bor Z. Jang, Centerville, OH (US)

(73) Assignee: Global Graphene Group, Inc., Dayton, OH (US)

(*) Notice: Subject to any disclaimer, the term of this patent is extended or adjusted under 35 U.S.C. 154(b) by 0 days.

(21) Appl. No.: 15/985,053

(22) Filed: May 21, 2018

(65) Prior Publication Data
US 2019/0352806 A1 Nov. 21, 2019

(51) Int. Cl.
C01B 32/19 (2017.01)
D01F 9/14 (2006.01)

(52) U.S. Cl.
CPC ............ *D01F 9/14* (2013.01); *C01B 32/19* (2017.08); *C01B 2204/24* (2013.01); *C01B 2204/26* (2013.01); *C01P 2004/03* (2013.01); *C01P 2004/04* (2013.01)

(58) Field of Classification Search
CPC ... D01F 9/22; D01F 9/145; D01F 9/12; H01B 1/04; C09K 5/14; Y10S 977/847; Y10S 977/734; Y10S 977/961; B82Y 30/00; B82Y 40/00
See application file for complete search history.

(56) References Cited

U.S. PATENT DOCUMENTS

| 7,071,258 B1 | 7/2006 | Jang et al. |
| 8,927,065 B2 | 1/2015 | Zhamu et al. |
| 2003/0089893 A1 | 5/2003 | Niu et al. |
| 2005/0271574 A1 | 12/2005 | Jang et al. |

(Continued)

FOREIGN PATENT DOCUMENTS

WO 2006130150 A9 6/2009

OTHER PUBLICATIONS

Melucci, Manuela, et al. "Facile covalent functionalization of graphene oxide using microwaves: bottom-up development of functional graphitic materials." Journal of Materials Chemistry 20.41 (2010): 9052-9060.*

(Continued)

*Primary Examiner* — Richard M Rump

(57) ABSTRACT

A process for producing a fabric comprising at least a graphene-based continuous or long fiber, comprising: (a) preparing a graphene dispersion having chemically functionalized graphene sheets dispersed in a fluid; (b) dispensing, depositing, and shearing at least a continuous or long filament of the graphene dispersion onto a substrate, and removing the fluid to form a continuous or long fiber comprising aligned chemically functionally graphene sheets; and (c) inducing chemical reactions between chemical functional groups attached to adjacent graphene sheets to form the graphene fiber; (d) combining the graphene fiber with a plurality of fibers, the same type as or different than the graphene fiber, to form at least one fiber yarn; and (e) combining the at least one fiber yarn and a plurality of fiber yarns, the same type as or different than the at least one fiber yarn, to form the fabric.

11 Claims, 11 Drawing Sheets

(56) References Cited

U.S. PATENT DOCUMENTS

| | | | |
|---|---|---|---|
| 2008/0048152 A1 | 2/2008 | Jang et al. | |
| 2010/0055025 A1 | 3/2010 | Jang et al. | |
| 2011/0017587 A1* | 1/2011 | Zhamu | B82Y 30/00 |
| | | | 204/157.62 |
| 2011/0017955 A1 | 1/2011 | Zhamu et al. | |
| 2011/0062422 A1 | 3/2011 | Ryu et al. | |
| 2015/0037530 A1 | 2/2015 | Zhamu et al. | |
| 2015/0038041 A1* | 2/2015 | Zhamu | D03D 15/0088 |
| | | | 442/195 |
| 2015/0239741 A1* | 8/2015 | Burton | C08G 65/321 |
| | | | 525/327.3 |
| 2017/0225233 A1 | 8/2017 | Zhamu et al. | |

OTHER PUBLICATIONS

Cong et al., "Wet-spinning assembly of continuous, neat, and macroscopic graphene fibers" Scientific Report (2012) vol. 2, pp. 613-618.

Dong et al., "Facile fabrication of light, flexible and multifunctional graphene fibers" Ad. Mater. (2012) vol. 24, pp. 1856-1861.

Georgakilas et al., "Functionalization of Graphene: Covalent and Non-Covalent Approaches, Derivatives and Applications" Chem. Rev. (2012) vol. 112, No. 11, pp. 6156-6214; DOI: 10.1021/cr3000412.

Karlicky et al., "Halogenated Graphenes: Rapidly Growing Family of Graphene Derivatives" ACS Nano (2013) vol. 7, No. 8, pp. 6434-6464.

Wan et al., "Sequentially bridged graphene sheets with high strength, toughness, and electrical conductivity" PNAS Latest Articles, 6 pages. www.pnas.org/cgi/doi/10.1073/pnas.1719111115.

Xu et al., "Graphene chiral liquid crystals and macroscopic assembled fibers" Nature Communications (2011) vol. 2, p. 571-580.

PCT/US19/33051 International Search Report and Written Opinion dated Sep. 6, 2019, 14 pages.

U.S. Appl. No. 15/985,045 Final Office Action dated Feb. 21, 2020, 9 pages.

U.S. Appl. No. 15/985,045 Nonfinal Office Action dated Aug. 9, 2019, 9 pages.

U.S. Appl. No. 15/985,045 Final Office Action dated Jul. 13, 2020, 8 pages.

* cited by examiner

20 μm (Scale bar ___ = 5 μm per interval)   Arrow = fiber axis direction (Scheme 1)

(Scheme 2)

PROCESS FOR PRODUCING FABRIC OF CONTINUOUS GRAPHENE FIBER YARNS FROM FUNCTIONALIZED GRAPHENE SHEETS

FIELD OF THE INVENTION

The present invention relates generally to the field of graphene fiber yarns and fabrics and, more particularly, to a new class of fabric containing continuous graphene fibers produced from functionalized graphene sheets. This new class of fibers, yarns, and fabrics exhibits a combination of exceptionally high tensile strength, elastic modulus, thermal conductivity, and electrical conductivity.

BACKGROUND OF THE INVENTION

Continuous carbon fibers and graphite fibers are produced from pitch, polyacrylonitrile (PAN), and rayon. Most carbon fibers (about 90%) are made from PAN fibers. A small amount (about 10%) is manufactured from petroleum pitch or rayon. Although the production of carbon fibers from different precursors requires different processing conditions, the essential features are very similar. Generally, carbon fibers are manufactured by a controlled pyrolysis of stabilized precursor fibers. Precursor fibers (e.g. PAN) are first stabilized at about 200-400° C. in air by an oxidization process. The resulting infusible, stabilized fibers are then subjected to a high temperature treatment at approximately 1,000-1,500° C. (up to 2,000° C. in some cases) in an inert atmosphere to remove hydrogen, oxygen, nitrogen, and other non-carbon elements. This step is often called carbonization and it can take 2-24 hours to complete, depending upon the carbonization temperature and the starting material used. Carbonized fibers can be further graphitized at an even higher temperature, up to around 3,000° C. to achieve higher carbon content and higher degree of graphitization, mainly for the purpose of achieving higher Young's modulus or higher strength in the fiber direction. This takes another 1-4 hours under strictly controlled atmosphere and ultra-high temperature conditions. The properties of the resulting carbon/graphite fibers are affected by many factors, such as crystallinity, crystallite sizes, molecular orientation, carbon content, and the type and amount of defects.

Specifically, the carbon fibers can be heat-treated to become high modulus graphite fibers (from pitch) or high strength carbon fibers (from PAN-based). Carbon fibers heated in the range from 1500-2000° C. (carbonization) exhibits the highest tensile strength (5,650 MPa), while carbon fiber heated from 2500 to 3000° C. (graphitizing) exhibits a higher modulus of elasticity (531 GPa). The tensile strength of carbon/graphite fibers is typically in the range from 1-6 GPa, and the Young's modulus is typically in the range from 100-588 GPa.

Broadly speaking, in terms of final mechanical properties, carbon/graphite fibers can be roughly classified into ultra-high modulus (>500 GPa), high modulus (>300 GPa), intermediate modulus (>200 GPa), low modulus (100 GPa), and high strength (>4 GPa) carbon fibers. Carbon fibers can also be classified, based on final heat treatment temperatures, into type I (2,000° C. heat treatment), type II (1,500° C. heat treatment), and type III (1,000° C. heat treatment). Type II PAN-based carbon fibers are usually high strength carbon fibers, while most of the high modulus carbon fibers belong to type I from pitch.

Regardless the type of carbon fibers or graphite fibers desired, the production of continuous carbon fibers and graphite fibers from pitch, PAN, and rayon is a tedious, energy-intensive, very challenging (requiring extreme temperature and atmosphere control), and expensive process. A strong need exists for a facile, less energy-intensive, simpler and more scalable, and more cost-effective process for producing advanced fibers.

Carbon is known to have five unique crystalline structures, including diamond, fullerene (0-D nano graphitic material), carbon nanotube or carbon nanofiber (1-D nano graphitic material), graphene (2-D nano graphitic material), and graphite (3-D graphitic material, including graphite fiber). The carbon nanotube (CNT) refers to a tubular structure grown with a single wall or multi-wall. Carbon nanotubes (CNTs) and carbon nanofibers (CNFs) have a diameter on the order of a few nanometers to a few hundred nanometers. Their longitudinal, hollow structures impart unique mechanical, electrical and chemical properties to the material. The CNT or CNF is a one-dimensional nanocarbon or 1-D nano graphite material. Although multiple CNTs or CNFs can be spun into fiber yarns, these yarns are not considered as "continuous fibers". They are twisted aggregates of individual CNTs or CNFs (each being but a few microns long) that are not self-bonded together; instead, they are mechanically fastened together as a yarn.

Bulk natural graphite is a 3-D graphitic material with each particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are different in orientation. In other words, the orientations of the various grains in a graphite particle typically differ from one grain to another.

A graphite single crystal (crystallite) per se is anisotropic with a property measured along a direction in the basal plane (crystallographic a- or b-axis direction) being dramatically different than if measured along the crystallographic c-axis direction (thickness direction). For instance, the thermal conductivity of a graphite single crystal can be up to approximately 1,920 W/mK (theoretical) or 1,800 W/mK (experimental) in the basal plane (crystallographic a- and b-axis directions), but that along the crystallographic c-axis direction is less than 10 W/mK (typically less than 5 W/mK). Further, the multiple grains or crystallites in a graphite particle are typically all oriented along different directions. Consequently, a natural graphite particle composed of multiple grains of different orientations exhibits an average property less than 200 W/mK.

It would be highly desirable in many applications to produce a bulk graphite-derived object or graphitic fiber having sufficiently large dimensions and having all graphene planes being essentially parallel to one another along one desired direction (e.g. along the fiber axis).

The constituent graphene planes of a graphite crystallite can be exfoliated and extracted or isolated from a graphite crystallite to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene sheets/platelets or NGPs are a new class of carbon nanomaterial (a 2-D nano carbon) that is distinct from the 0-D fullerene, the 1-D CNT, and the 3-D graphite.

Our research group pioneered the development of graphene materials as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Patent Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Patent Pub. No. 2008-0048152).

In a recent report [Z. Xu & C. Gao, "Graphene chiral liquid crystals and macroscopic assembled fibers," *Nature Communications*, 2, 571 (2011)], graphene oxide sheets can form chiral liquid crystals in a twist-grain-boundary phase-like model with simultaneous lamellar ordering and long-range helical frustrations. Aqueous graphene oxide liquid crystals can then be continuously spun into meters of macroscopic graphene oxide fibers, which are chemically reduced to obtain RGO fibers. During the spinning process for GO fibers, the GO dispersions were loaded into glass syringes and injected into the NaOH/methanol solution under the conditions of 1.5 MPa $N_2$. The NaOH/methanol solution is a coagulation solution (a non-solvent for GO) and the GO sheets are precipitated out in a loosely connected, very low density fiber. The fibers produced in the coagulation bath were then rolled onto a drum, washed by methanol to remove the salt, and dried for 24 hours at room temperature. The as-prepared GO fibers were then chemically reduced in the aqueous solution of hydro-iodic acid (40%) at 80° C. for 8 hours, followed by washing with methanol and vacuum drying for 12 hours.

Clearly, this is a very tedious and time-consuming process. Further, the GO sheets must be dispersed in water to a critical extent that they form chiral liquid crystals with a twist-grain-boundary phase structure in the GO suspension. This chiral or twist-grain boundary structure is a fatal defect as far as the mechanical strength of macroscopic graphene fibers is concerned, as evidenced by the relatively low tensile strength (102 MPa) reported by Xu, et al. This is three orders of magnitude lower than the intrinsic strength (130 GPa) of individual graphene sheets. Another severe problem of this process is the notion that the spinning-coagulation procedure inherently results in highly porous and non-oriented graphene sheets in the graphene fiber (e.g. FIG. 2(c) and FIG. 2(d)). This porous and non-parallel graphene structure is another reason responsible for such a low tensile strength and low Young's modulus (5.4 GPa), which is almost three orders of magnitude lower than the theoretical Young's modulus of graphene (1,000 GPa).

A similar spinning-coagulation process was reported by Cong, et al [H. P. Cong, et al. "Wet-spinning assembly of continuous, neat, and macroscopic graphene fibers," Scientific Report, 2 (2012) 613; DOI: 10.1038/srep00613]. Again, the reported tensile strength and Young's modulus of the graphene fibers are very poor: 145 MPa and 4.2 GPa, respectively. Slightly better tensile strength (180 MPa) was observed with graphene oxide fibers prepared by a confined-dimension hydrothermal method was reported [Z. Dong, et al. "Facile fabrication of light, flexible and multifunctional graphene fibers," Adv. Mater. 24, 1856-1861 (2012)]. Even after a thermal reduction treatment, the maximum achievable tensile strength was only 420 MPa. Again, the graphene sheets in these graphene fibers, just like in the graphene fibers prepared by spinning-coagulation, remain discrete and poorly oriented. The fibers are also highly porous and of limited length. Furthermore, this process is not a scalable process and cannot be used to mass-produce continuous graphene fibers.

In most of the practical applications, fibers and yarns are not the final utilization shape or form. A particularly useful form is fabric, which may be obtained by weaving, braiding, knitting, or by a non-woven process. The properties of a fabric depend on the properties of the fibers. For illustration purposes, cotton or wool fibers are used to keep a person warm in the winter, asbestos fibers are used as a flame retardant, carbon fibers for strength reinforcement, glass fibers for insulation, metallic fibers for conducting electricity. Unfortunately, combining fibers does not always result in a fabric that possesses a useful set of properties for a range of applications. For example, anti-ballistic fibers, such as Kevlar, are sensitive to heat. Although adding flame retardant fibers may provide limited support, Kevlar fabrics would not work optimally as a projectile resistant material if exposed to continuous heat. Ideally, compatible fibers having unique mechanical, thermal, electrical, optical, and chemical properties would be formed into fabrics that demonstrate all the desired properties within the fabric. However, all the state-of-the-art fabrics have a limited range of applications due to the limited functional properties of their constituent fibers.

Fabric quality and functional performance depends on the ability to inter-weave yarns with one another. The material structure, size, and shape of the fibers and resulting yarns may become limiting factors for the range of application of a certain fabric. For examples, fabrics that block entry of pathogenic agents require that the yarns of consistent quality be interwoven tightly to prevent any gaps between one another. The thickness and shapes of individual fibers alone could allow significant gaps within each yarn defined by those fibers. Generally, there are no available continuous fibers having a nanometer diameter/thickness and shape that provide significant strength, ductility, geometric flexibility, and cross-sectional shape of a yarn so as to define a multi-functional fabric. There is an urgent need to have a new type of graphitic fibers that can be made into a multi-functional fabric.

We have developed a graphene-based continuous or long fibers that exhibit exceptional mechanical, electrical, and thermal properties. We proceeded to further investigate the technical feasibility of weaving/braiding these continuous graphene fibers into a fabric and explore the potential utilization of such a fabric. These new graphene fibers are generally flat-shaped in cross-section (non-circular, non-ellipsoidal, and non-oval shape), with a large width (typically from 0.01 μm to 20 μm and more typically from 0.1 μm to 10 μm, but readily adjustable) and a small thickness (typically from 1 nm to 1 μm, readily adjustable), hence a high width-to-thickness ratio (typically from 10 to 1000).

They are relatively solid and non-porous. These shapes, structures, and morphologies are in contrast to those of the graphene fibers produced by coagulation and spinning, which are helical and highly porous in nature and have a chiral or twist-grain boundary structure. The helical structure and high porosity level of these conventional graphene fibers are a natural consequence of the liquid crystal structure of the starting graphene oxide material and the required precipitation of graphene from a liquid coagulation bath. The graphene fibers obtained by drawing CVD graphene films into a fibrous form are also highly porous. These pores and helices severely weaken these conventional fibers, exhibiting dramatically lower elastic modulus and strength.

We have further observed that, due to the substantially rectangular cross-section of some of the presently invented continuous graphene fibers, the yarns containing multiple continuous fibers can have a cross-section that is rectangular or flat-shaped. When one combines multiple filaments together (e.g. of those conventional fibers with a circular cross-section or irregular-shape cross-section), there is a limit to the packing factor. The highest packing factor is typically between 50% and 65% by volume even for circular-cross-section fibers. In contrast, the presently invented rectangular or flat-shaped graphene fibers can be packed into a yarn with a packing factor close to essentially 100%. The packing factor can be adjusted to be between 20% and essentially 100%, for composite structure or filter applications. A packing factor of 70-85% is particularly useful for composite applications. Our research data have demonstrated that the flexural strength and elastic modulus values of polymer matrix composites containing presently invented graphene fiber-based fabrics as a reinforcement phase are significantly higher than those of the composites containing a comparable volume fraction of conventional graphitic fibers. Additionally, fabrics that block entry of pathogenic agents require that the yarns of highest packing factors be interwoven tightly to prevent any gaps between one another. The thickness and shapes of conventional fibers alone could allow significant gaps within each yarn defined by those fibers. The instant invention provides tightly packed yarns and fabrics. These features are not achievable with conventional graphitic fibers.

It is an object of the present invention to provide yarns and fabrics containing high-strength and high-modulus continuous graphene fibers by using particles of natural graphite or artificial graphite as the starting material for graphene sheet production. A specific object of the present invention is to provide a fabric that contains graphene-derived continuous or long graphene fibers that are composed of functionalized graphene sheets that are chemically bonded or interconnected together, not just an aggregate of discrete graphene sheets. Another object of this invention is to provide a process for producing such a graphene fabric.

SUMMARY OF THE INVENTION

The present invention provides a fabric comprising multiple yarns combined to form the fabric, wherein at least one of said yarns comprises one or a plurality of graphene-based long or continuous fibers. The graphene-based long or continuous fiber comprises chemically functionalized graphene sheets that are chemically bonded or interconnected with one another having an inter-planar spacing $d_{002}$ from 0.36 nm to 1.5 nm as determined by X-ray diffraction and a non-carbon element content (e.g. H, O, N, B, P, Cl, F, Br, I, S, etc.) of 0.1% to 47% by weight, wherein the functionalized graphene sheets are substantially parallel to one another (typically having a degree of orientation from 86% to 99%) and parallel to the fiber axis direction and the fiber contains no core-shell structure, have no helically arranged graphene domains, and have a length no less than 0.5 cm and a physical density from 1.5 to 2.25 g/cm$^3$. This long fiber can be an essentially "continuous fiber" wound as a spool on a roller and having a length up to several kilometers (e.g. 10 km). The graphene sheets are typically interconnected with one another via chemical bonding or reactions between the chemically active functional groups attached to respective adjacent graphene sheets. These chemically active functional groups are capable of reacting with neighboring functional groups by forming covalent bonds, hydrogen bonds, and/or π-π bonds.

One interesting and unique characteristic of the presently invented fabric is that the constituent fibers derived from functionalized graphene sheets can be made into a more-or-less rectangular cross-section (e.g. as schematically shown in FIG. 4(b)). As a consequence, the yarns containing multiple continuous fibers can have a cross-section that is rectangular or flat-shaped. The fibers can be combined into a yarn having a packing factor >60% by volume (void content <40% by volume). The packing factor can be and, typically, is greater than 70% or even 80%. In principle, the rectangular fibers of the instant invention enable a yarn packing factor approaching 100% by volume. Preferably, the yarns have a width-to-thickness ratio greater than 5, more preferably >20, and can be greater than 150. The fabric or the yarn can have a thickness less than 1 μm, or even less than 100 nm.

The fabric, the yarn, or the graphene-based long or continuous fiber can have a cross-section that is rectangular or flat-shaped, having a width and a thickness. The fabric or a yarn may have a thickness as small as from 10 nm to 1 μm. A flat-shaped fiber or yarn has a cross-section with a width-to-thickness ratio of at least 2, preferably at least 3, more preferably at least 5, but can be from 1.5 to 1,000. When one combines multiple conventional filaments together (e.g. those conventional fibers with a circular cross-section or irregular-shape cross-section), there is a limit to the packing factor. The highest packing factor is typically between 50% and 65% by volume even for circular-cross-section fibers. In contrast, as shown in FIG. 4(b), the presently invented rectangular or flat-shaped graphene fibers can be packed into a yarn with an essentially 100% packing factor, if so desired. The packing factor can be adjusted to be between 20% and 100%, preferably between 40% and 95%, more preferably between 60% and 90%, and most preferably between 70% and 85% for composite structure or filter applications. Our research data have demonstrated that the flexural strength and elastic modulus values of polymer matrix composites containing presently invented graphitic fiber-based fabrics as a reinforcement phase are significantly higher than those of the composites containing a comparable volume fraction of conventional graphitic fibers. The differences are typically between 30% and 300%.

As another example, fabrics that block entry of pathogenic agents require that the yarns of highest packing factors be interwoven tightly to prevent any gaps between one another. The thickness and shapes of conventional fibers alone could allow significant gaps within each yarn defined by those fibers. The instant invention provides tightly packed yarns and fabrics. These features are not achievable with conventional graphitic fibers.

The present invention also provides a process for producing fabrics containing graphene-based continuous or long fibers from chemically functionalized graphene sheets and, subsequently, the yarns and fabrics containing these fibers. In certain embodiments, the process comprises:

(a) preparing a graphene dispersion having chemically functionalized graphene sheets dispersed in a liquid medium (e.g. water or an organic solvent), wherein the chemically functionalized graphene sheets contain chemical functional groups attached thereto (on graphene sheet surfaces and/or edges) and a non-carbon element content of 0.1% to 47% by weight;

(b) dispensing and depositing at least a continuous or long filament of the graphene dispersion onto a supporting substrate, wherein the dispensing and depositing procedure includes mechanical shear stress-induced alignment of the chemically functionalized graphene sheets along the filament axis direction, and partially or completely removing the liquid medium from the filament to form a continuous or long fiber comprising aligned chemically functionally graphene sheets;

(c) using heat (typically from 0 to 200° C.), electromagnetic waves (e.g. radio frequency waves, or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets to form the long or continuous graphene fiber, wherein the long graphene fiber comprises chemically functionalized graphene sheets that are chemically bonded with one another having an inter-planar spacing $d_{002}$ from 0.36 nm to 1.5 nm as determined by X-ray diffraction and a non-carbon element content of 0.1% to 40% by weight and wherein the functionalized graphene sheets are substantially parallel to one another and parallel to the fiber axis direction and the fiber contains no core-shell structure, have no helically arranged graphene domains, and have a length no less than 0.5 cm and a physical density from 1.5 to 2.25 $g/cm^3$;

(d) combining at least one such continuous or long graphene fiber with a plurality of the same type or different type(s) of fibers to prepare continuous or long fiber yarns; and (e) combining these fiber yarns and other fiber yarns (the same or different types) into a fabric.

Preferably, multiple continuous graphene fibers of this type are formed into yarns of a desired shape. Multiple yarns of this type of continuous graphene fibers, alone or in combinations with other types of fibers or yarns, are made into a fabric using known yarn- and fabric-producing methods.

The process may further comprise a step of compressing the continuous or long fiber (after step (b) or (c)) to increase the degree of graphene sheet orientation and physical density, and to improve the contact between chemically functionalized graphene sheets. This would also facilitate chemical interconnection between graphene sheets.

The invention also provides a process for producing a fabric containing graphene-based long fibers from graphene sheets. In certain embodiments, the process comprises:

(a) preparing a graphene dispersion having graphene sheets dispersed in a fluid medium (e.g., water or an organic solvent);

(b) dispensing and depositing at least a continuous or long filament of the graphene dispersion onto a supporting substrate, wherein the dispensing and depositing procedure includes mechanical shear stress-induced alignment of the graphene sheets along a filament axis direction, and partially or completely removing the fluid medium from the filament to form a continuous or long fiber comprising aligned graphene sheets;

(c) bringing the continuous or long fiber in contact with a chemical functionalizing agent so as to produce a continuous or long fiber of chemically functionalized graphene sheets having chemical functional groups attached thereto and a non-carbon element content (e.g. H, O, N, B, P, Cl, F, Br, I, S, etc.) of 0.1% to 47% by weight;

(d) using heat (typically from 0 to 200° C.), electromagnetic waves (e.g. radio frequency waves, or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets to form said long graphene fiber, wherein said long graphene fiber comprises chemically functionalized graphene sheets that are chemically bonded with one another having an inter-planar spacing $d_{002}$ from 0.36 nm to 1.5 nm as determined by X-ray diffraction and a non-carbon element content of 0.1% to 47% by weight and wherein said functionalized graphene sheets are substantially parallel to one another and parallel to a fiber axis direction and said fiber contains no core-shell structure, have no helically arranged graphene domains, and have a length no less than 0.5 cm and a physical density from 1.5 to 2.25 $g/cm^3$;

(e) combining at least one such continuous or long graphene fiber with a plurality of the same type or different type(s) of fibers to prepare continuous or long fiber yarns; and (f) combining these fiber yarns and other fiber yarns (the same or different types) into a fabric.

The process may further comprise a step of compressing the continuous or long fiber (after step (c) or (d)) to increase the degree of graphene sheet orientation and physical density, and to improve the contact between chemically functionalized graphene sheets.

The continuous or long graphene fiber can have a cross-section that is circular, elliptical, rectangular, flat-shaped, or hollow depending upon the geometry of the shaping die used. Preferred shapes of continuous or long graphene fibers for use in the fabric are rectangular or flat-shaped. The diameter or thickness of the presently invented graphene fiber can be varied from nanometer scaled to millimeter-scaled; there is no restriction on the fiber diameter/thickness. This is a very important feature that cannot be found in any other type of continuous carbon fiber or graphite fiber.

For instance, the presently invented continuous or long fiber can have a diameter or thickness up to 100 μm (or greater), which cannot be obtained with conventional carbon or graphite fibers. The continuous or long graphene fiber can have a diameter or thickness less than 10 μm or even less than 1 μm, which is not possible with other types of continuous carbon or graphite fibers having a high strength. Quite significantly, the continuous graphene fiber can have a diameter or thickness less than 100 nm.

The chemically functionalized graphene sheets in the continuous or long fiber may contain one or more chemical functional groups.

The process may further comprise a step of reducing the non-carbon content to less than 20% (preferably less than 5%) by weight using chemical, thermal, UV, or radiation-induced reduction means. For instance, one may optionally subject the long or continuous fiber to a heat treatment at a temperature of typically 200-700° C. to thermally reduce the non-carbon content. However, for thermally activating the required cross-linking or interconnecting reactions between chemically active functional groups of neighboring graphene sheets, a temperature lower than 200° C. is typically sufficient (more typically lower than 150° C. and further more typically lower than 100° C. is sufficient).

In certain embodiments, the inter-plane spacing $d_{002}$ is from 0.4 nm to 1.2 nm, the non-carbon element content is from 1% to 20%, or physical density from 1.7 to 2.15 g/cm$^3$.

The continuous or long fiber can have a cross-section that is circular, elliptical, rectangular, flat-shaped, or hollow. The fiber preferably has a length from 1 cm to 10,000 meters, a cross-section having a width (or second largest dimension) from 1 µm to 5 mm, and a thickness (or smallest dimension) from 10 nm to 500 µm, and a width-to-thickness ratio from 1 to 10,000. Preferably, the long fiber has a width from 1 to 20 am and a thickness from 100 nm to 100 µm.

In certain embodiments, the long fiber has a thermal conductivity from 200 to 1,600 W/mK or an electrical conductivity from 600 to 15,000 S/cm; preferably and typically having a thermal conductivity of at least 350 W/mK or an electrical conductivity no less than 1,000 S/cm; further preferably and typically having a thermal conductivity of at least 600 W/mK or an electrical conductivity no less than 2,500 S/cm; still further preferably having a thermal conductivity of at least 1,000 W/mK or an electrical conductivity no less than 5,000 S/cm; and most preferably having a thermal conductivity of at least 1,200 W/mK, or an electrical conductivity no less than 8,000 S/cm.

In certain embodiments, the long fiber contains a first graphene domain containing bonded graphene planes parallel to one another and having a first crystallographic c-axis, and a second graphene domain containing bonded graphene planes parallel to one another and having a second crystallographic c-axis wherein the first crystallographic c-axis and the second crystallographic c-axis are inclined with respect to each other at an angle less than 10 degrees.

The degree of graphene sheet orientation in a continuous or long fiber was mainly measured using a well-known method based on the full width at half maximum (FWHM) of X-ray scattering intensity as a function of the azimuthal angle. The degree of orientation may be calculated from the following equation: $\Phi = 100\% \times (180 - FWHM)/180$. The degree of orientation of graphene sheets in the presently invented continuous or long fibers is typically from 86% to 99% and more typically from 87% to 99%. It is of interest to note that the use of comma coating for graphene dispersion deposition typically results in a continuous and long graphene fiber having a degree of orientation of approximately from 87% to 93%. The slot-die coating procedure for preparing graphene fibers having a flat-shape cross-section typically leads to a degree of orientation of approximately from 90% to 96% and a reverse-roll coating procedure leads to a degree of graphene sheet orientation from 93% to 99%.

In certain embodiments, the long fiber contains a combination of sp$^2$ and sp$^a$ electronic configurations. There are graphene edge-to-edge, edge-to-graphene plane, and graphene plane-to-graphene plane bonding (covalent bonds or π-π bonds) between functionalized graphene sheets.

The invented process may further comprise a step of incorporating the long fiber to produce a fiber yarn or bundle. In certain embodiments, the process further comprises a step of incorporating a plurality of the invented long fibers to produce a fiber yarn or bundle.

The present invention also provides a fiber yarn (e.g. a twisted (plied) yarn, non-twist (non-plied) yarn, or braid) or bundle comprising at least a continuous or long fiber of present invention. The yarn or bundle can also contain other type of fibers (e.g. carbon fibers) to form a hybrid yarn or bundle. The invention also provides a fiber yarn or bundle comprising a plurality of presently invented continuous or long fibers. The invention also provides a fabric, which may be woven, braided, knit or nonwoven.

Another embodiment of the present invention is a filter that contains the presently invented fabric as a filtering element. Such a filter is found to have a desirable combination of filtering efficiency, filter useful life, filter strength and structural integrity.

DESCRIPTION OF THE PREFERRED EMBODIMENTS

Figure 1:
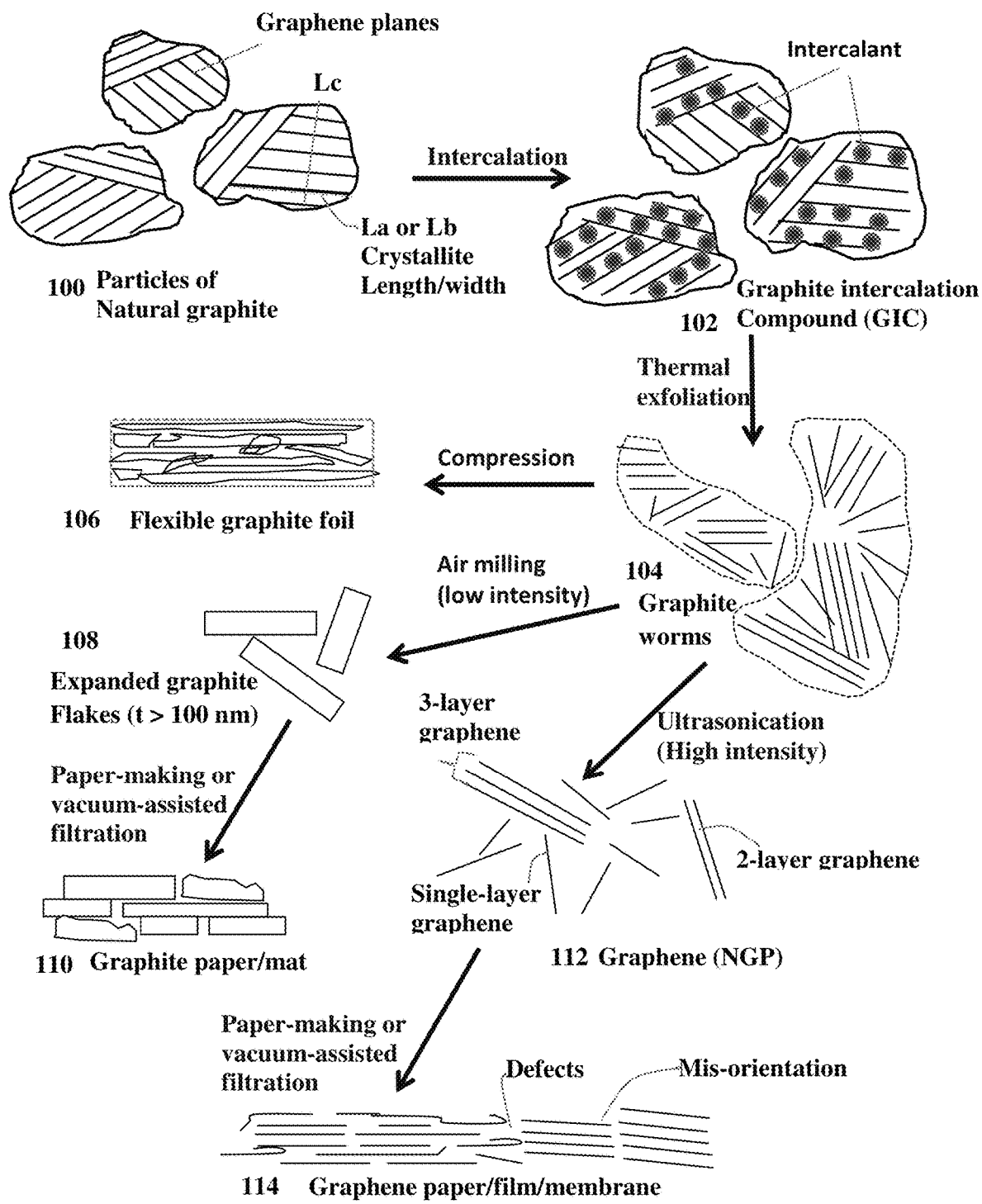
FIG. 1 Schematic drawing illustrating the processes for producing conventional paper, mat, film, and membrane of simply aggregated graphite or graphene flakes/platelets. All processes begin with intercalation and/or oxidation treatment of graphitic materials (e.g. natural graphite particles).

The present invention provides a fabric, and constituent yarns, containing graphene-based continuous or long fibers which comprise chemically functionalized graphene sheets that are chemically bonded interconnected with one another having an inter-planar spacing $d_{002}$ from 0.36 nm to 1.5 nm as determined by X-ray diffraction and a non-carbon element content (e.g. H, O, N, B, P, Cl, F, Br, I, S, etc.) of 0.1% to 47% by weight, wherein the functionalized graphene sheets are substantially parallel to one another and parallel to the fiber axis direction and the fiber contains no core-shell structure, have no helically arranged graphene domains, and have a length no less than 0.5 cm and a physical density from 1.5 to 2.25 g/cm$^3$. This long fiber can be an essentially "continuous fiber" wound as a spool on a roller and having a length up to several kilometers (e.g. 10 km). The graphene sheets are typically interconnected with one another via chemical bonding or reactions between the chemically active functional groups attached to respective adjacent functional groups.

The present invention also provides a process for producing a fabric containing graphene-based continuous or long fibers from chemically functionalized graphene sheets. In certain embodiments, the process comprises:
(a) preparing a graphene dispersion having chemically functionalized graphene sheets dispersed in a liquid medium (e.g. water or an organic solvent), wherein the chemically functionalized graphene sheets contain chemical functional groups attached thereto (on graphene sheet surfaces and/or edges) and a non-carbon element content of 0.1% to 47% by weight;
(b) dispensing and depositing at least a continuous or long filament of the graphene dispersion onto a supporting substrate (e.g. using casting, slot-die coating, comma coating, reverse-roll coating, ultrasonic spraying, or pressure air-assisted spraying, etc.), wherein the dispensing and depositing procedure includes applying a mechanical shear stress to induce alignment of the chemically functionalized graphene sheets along the filament axis direction, and partially or completely removing the liquid medium from the filament to form a continuous or long fiber comprising aligned chemically functionally graphene sheets (e.g. the coating head can create a high shear stress between the dispensed graphene dispersion and the supporting substrate that undergoes a relative fast motion relative to the coating head);
(c) using heat, electromagnetic waves (e.g. radio frequency waves, or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets to form the long graphene fiber, wherein the long graphene fiber comprises chemically functionalized graphene sheets that are chemically bonded or interconnected with one another having an inter-planar spacing $d_{002}$ from 0.36 nm to 1.5 nm as determined by X-ray diffraction and a non-carbon element content of 0.1% to 40% by weight and wherein the functionalized graphene sheets are substantially parallel to one another and parallel to the fiber axis direction and the fiber contains no core-shell structure, have no helically arranged graphene domains, and have a length no less than 0.5 cm and a physical density from 1.5 to 2.2 g/cm$^3$;
(d) combining at least one such continuous or long graphene fiber with a plurality of the same type or different type(s) of fibers to prepare continuous or long fiber yarns; and
(e) combining these fiber yarns and other fiber yarns (the same or different types) into a fabric.

It is important to note that multiple filaments can be produced concurrently if we dispense and form multiple continuous filaments of functionalized graphene sheets onto a supporting substrate at the same time. There is no limitation as to how many filaments can be generated at the same time. Hundreds, thousands, or tens of thousands of filaments can be made and combined into a continuous yarn when or after these filaments are made.

Step (a) includes dispersing chemically functionalized graphene sheets in a liquid medium, such as water or organic solvent. The production of graphene sheets is well-known in the art. Some details about how to prepare graphene dispersion in step (a) of the invented process are presented below.

As an example, a graphite intercalation compound (GIC) or graphite oxide may be obtained by immersing powders or filaments of a starting graphitic material in an intercalating/oxidizing liquid medium (e.g. a mixture of sulfuric acid, nitric acid, and potassium permanganate) in a reaction vessel. The starting graphitic material may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

When the starting graphite powders or filaments are mixed in the intercalating/oxidizing liquid medium, the resulting slurry is a heterogeneous suspension and appears dark and opaque. When the oxidation of graphite proceeds at a reaction temperature for a sufficient length of time (4-120 hours at room temperature, 20-25° C.), the reacting mass can eventually become a suspension that appears slightly green and yellowish, but remain opaque. If the degree of oxidation is sufficiently high (e.g. having an oxygen content between 20% and 50% by weight, preferably between 30% and 50%) and all the original graphene planes are fully oxidized, exfoliated and separated to the extent that each oxidized graphene plane (now a graphene oxide sheet or molecule) is surrounded by the molecules of the liquid medium, one obtains a GO gel.

The aforementioned features are further described and explained in detail as follows: As illustrated in FIG. 1, a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1, different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

In one prior art process, the exfoliated graphite (or mass of graphite worms) is re-compressed by using a calendaring or roll-pressing technique to obtain flexible graphite foils (106 in FIG. 1), which are typically 100-300 μm thick.

Largely due to the presence of defects, commercially available flexible graphite foils normally have an in-plane electrical conductivity of 1,000-3,000 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects are also responsible for the low mechanical strength (e.g. defects are potential stress concentration sites where cracks are preferentially initiated). These properties are inadequate for many thermal management applications and the present invention is made to address these issues. In another prior art process, the exfoliated graphite worm may be impregnated with a resin and then compressed and cured to form a flexible graphite composite, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nano graphene platelets (NGPs) with all the graphene platelets thinner than 100 nm, mostly thinner than 10 nm, and, in many cases, being single-layer graphene (also illustrated as 112 in FIG. 1). An NGP is composed of a graphene sheet or a plurality of graphene sheets with each sheet being a two-dimensional, hexagonal structure of carbon atoms.

Further alternatively, with a low-intensity shearing, graphite worms tend to be separated into the so-called expanded graphite flakes (108 in FIG. 1) having a thickness >100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm and most preferably 0.34 nm-1.7 nm in the present application. When the platelet is approximately circular in shape, the length and width are referred to as diameter. In the presently defined NGPs, both the length and width can be smaller than 1 μm, but can be larger than 200 μm.

A mass of multiple NGPs (including discrete sheets/platelets of single-layer and/or few-layer graphene or graphene oxide) may be readily dispersed in water or a solvent and then made into a graphene paper (114 in FIG. 1) using a paper-making process. Many discrete graphene sheets are folded or interrupted (not integrated), most of platelet orientations being not parallel to the paper surface. The existence of many defects or imperfections leads to poor electrical and thermal conductivity in both the in-plane and the through-plane (thickness-) directions.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly made into a sheet of paper or a roll of paper.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene fiber can contain pristine or non-pristine graphene and the invented method allows for this flexibility.

Several methods have been developed to chemically functionalize graphene sheets (including pristine graphene, graphene oxide, and reduced graphene oxide or rGO). The reader may consult this review article: Vasilios Georgakilas, et al. "Functionalization of Graphene: Covalent and Non-Covalent Approaches, Derivatives and Applications," Chem. Rev., 2012, 112 (11), pp 6156-6214; DOI: 10.1021/cr3000412.

Pristine graphene is one of the most chemically inert materials because high energy barriers need to be overcome due to the rigid planar structure and remarkable interlayer conjugation. By diazonium chemistry and photochemistry, various functional groups have been grafted onto graphene. For the diazonium chemistry, stirring-assisted solution reaction may be tedious. For the photochemistry, either a focused laser spot may be used to generate a sufficiently high intensity, resulting in a localized functionalization of graphene sheets. A heat-initiated chemical reaction can be used to functionalize pristine graphene prepared by chemical vapor deposition (CVD) or liquid phase exfoliation.

The organic covalent functionalization reactions of graphene include two general routes: (a) the formation of covalent bonds between free radicals or dienophiles and C=C bonds of pristine graphene and (b) the formation of covalent bonds between organic functional groups and the oxygen groups of GO. The most attractive organic species for the reaction with sp2 carbons of graphene are organic free radicals and dienophiles. Usually both are intermediate reactive components that are produced under certain conditions in the presence of graphene.

Upon heating of a diazonium salt, a highly reactive free radical is produced, which attacks the sp2 carbon atoms of graphene, thereby forming a covalent bond. This reaction can be used to decorate graphene with nitrophenyls. The strong covalent binding of the nitrobenzyl group on graphene may be detected by X-ray photoelectron spectroscopy (XPS). The N1s XPS spectrum of the functionalized graphene normally exhibits two peaks at 406 and 400 eV that correspond to the nitrogen of $NO_2$ and the partially reduced nitrogen of the product, respectively. The reactions with diazonium salts have been applied to the functionalization of chemically or thermally converted graphene, single graphene sheets obtained by micromechanical cleavage from bulk graphite, and epitaxial graphene.

Hydroxylated aryl groups can be grafted covalently on graphene by the diazonium addition reaction. The ratio between carbon atoms with sp2 and sp3 hybridization in the graphitic lattice is an indication of the degree of oxidation or a covalent functionalization reaction. This ratio may be estimated using Raman spectroscopy as the ID/IG ratio, where ID and IG are the intensities of the peaks at ~1350 and 1580 $cm^{-1}$, which correspond to the number of sp3 and sp2 C atoms, respectively. Graphene is often defined as a pristine two-dimensional sp2 hybridized carbon sheet; as such the coexistence of sp3 carbons in the lattice are inherently classified as defects, where these defects can be on the basal edges or inside defects in the plane. For the modification described above, the ID/IG ratio is increased from 1.7 to ~2 after functionalization by diazonium addition.

An alternative free radical addition method includes the reaction of benzoyl peroxide with graphene sheets. Graphene sheets may be deposited on a silicon substrate and immersed in a benzoyl peroxide/toluene solution. The reaction is then initiated photochemically by focusing an Ar-ion laser beam onto the graphene sheets in the solution. The attachment of the phenyl groups is directly indicated by the appearance of a strong D band at 1343 $cm^{-1}$. The appearance of this D band is due to the formation of sp3 carbon atoms in the basal plane of graphene by covalent attachment of phenyl groups.

Figure 5A:
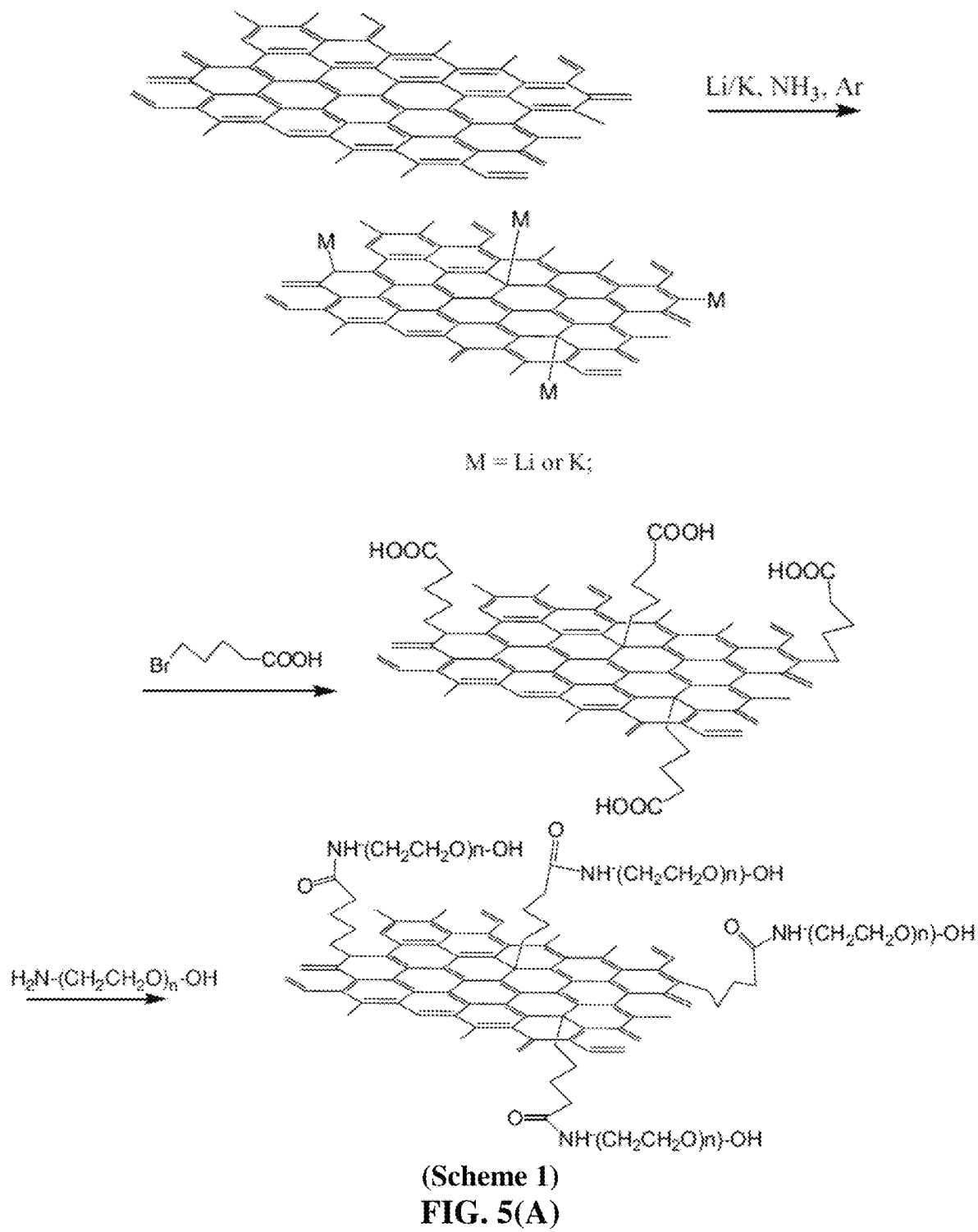
FIG. 5(a) Chemical functionalization of graphene sheets, Scheme 1.

A type of metalized graphene, potassium graphene, may be used in the reaction with 1-iododecane to produce dodecylated graphene (Scheme 1, FIG. 5(A)). The FT-IR spectra can be used to confirm presence of C—H stretching bands at 2800-3000 $cm^{-1}$ associated with the dodecyl groups. TGA may indicate a weight loss of 15%, which corresponds to about one dodecyl group per 78 graphite carbon atoms. The resulting dodecylated graphene is soluble in chloroform, benzene, and 1,2,4-trichlorobenzene. Additionally, its solubility in water can be achieved by the reaction of potassium graphene with 5-bromovaleric acid and subsequent reaction with amine-terminated PEG (see Scheme 1).

Top-down approaches may be used to prepare chemically-functionalized graphene with an objective to make them dispersible in a selected liquid medium. For instance, graphene oxide (GO) nanosheets having ample oxygen functionalities in the basal plane and along the edges may be selectively targeted for the chemical functionalization. In a first approach, for instance, octadecylamine (ODA) can be covalently grafted on the edges of reduced graphene oxide (rGO) via amide linkage and this can be confirmed by FTIR and XPS analyses. In a second approach, oxygen functionalities in the basal plane of GO can be selected to tether the octadecylamine via covalent, charge-induced electrostatic and hydrogen linkages between the amino group of ODA and epoxy, carboxylic and hydroxyl functionalities of GO, respectively. The chemical and structural features of products may be examined by FTIR, $^{13}$C NMR, XPS, XRD and HRTEM. In a third approach, rGO can be covalently functionalized with imidazolium ionic liquids having bis(salicylato)borate, oleate and hexafluorophosphate anions. Chemical functionalized graphene may also be obtained by the reaction of the residual epoxide and carboxyl functional groups on the hydrazine-reduced graphene sheets with hydroquinone.

Figure 5B:
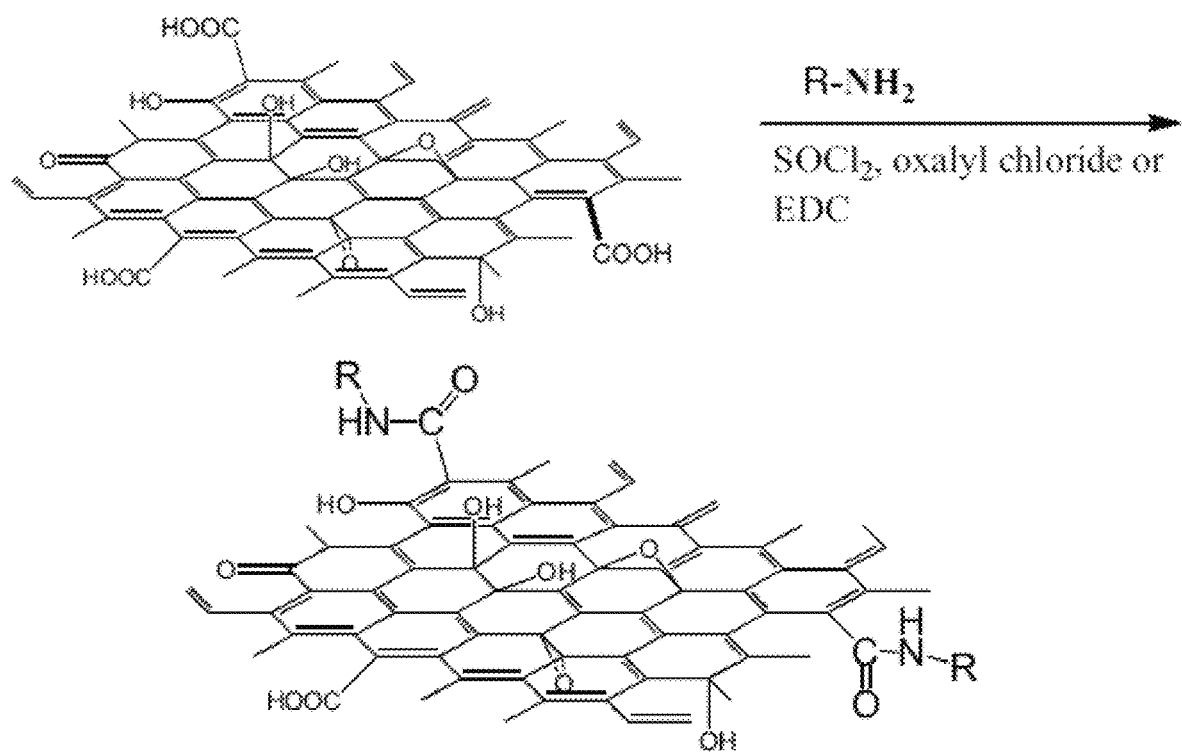
FIG. 5(b) Chemical functionalization of graphene sheets, Scheme 2.

A simple method often used for the functionalization of graphene is based on reactions of the carboxyl groups, present in GO and located at the edges of graphene sheets, with various amines or alcohols. Reactions of the graphene carboxyl groups with amines, leading to the formation of amides, were performed via various more reactive intermediates (see Scheme 2, FIG. 5(B)). As one example, to prepare graphene soluble in non-polar solvents, the acid-treated graphene is reacted with an excess of thionyl chloride ($SOCl_2$) and subsequently heated with dodecylamine. Defected graphene requires a harsher acid treatment over longer periods to enable its further functionalization. The functionalization may be confirmed by a shift in the C=O stretching band to 1650 cm$^{-1}$ due to the amide band and an appearance of C—H and N—H stretching bands at 2800 and 3300 cm$^{-1}$ as observed by FT-IR spectroscopy. Dodecylamide-functionalized graphene is dispersible in dichlormethane, carbon tetrachloride ($CCl_4$) and tetrahydrofuran (THF). A similar approach via an acyl chloride intermediate may also be used for the modification of graphite oxide with octadecylamine (ODA).

Figure 5C:
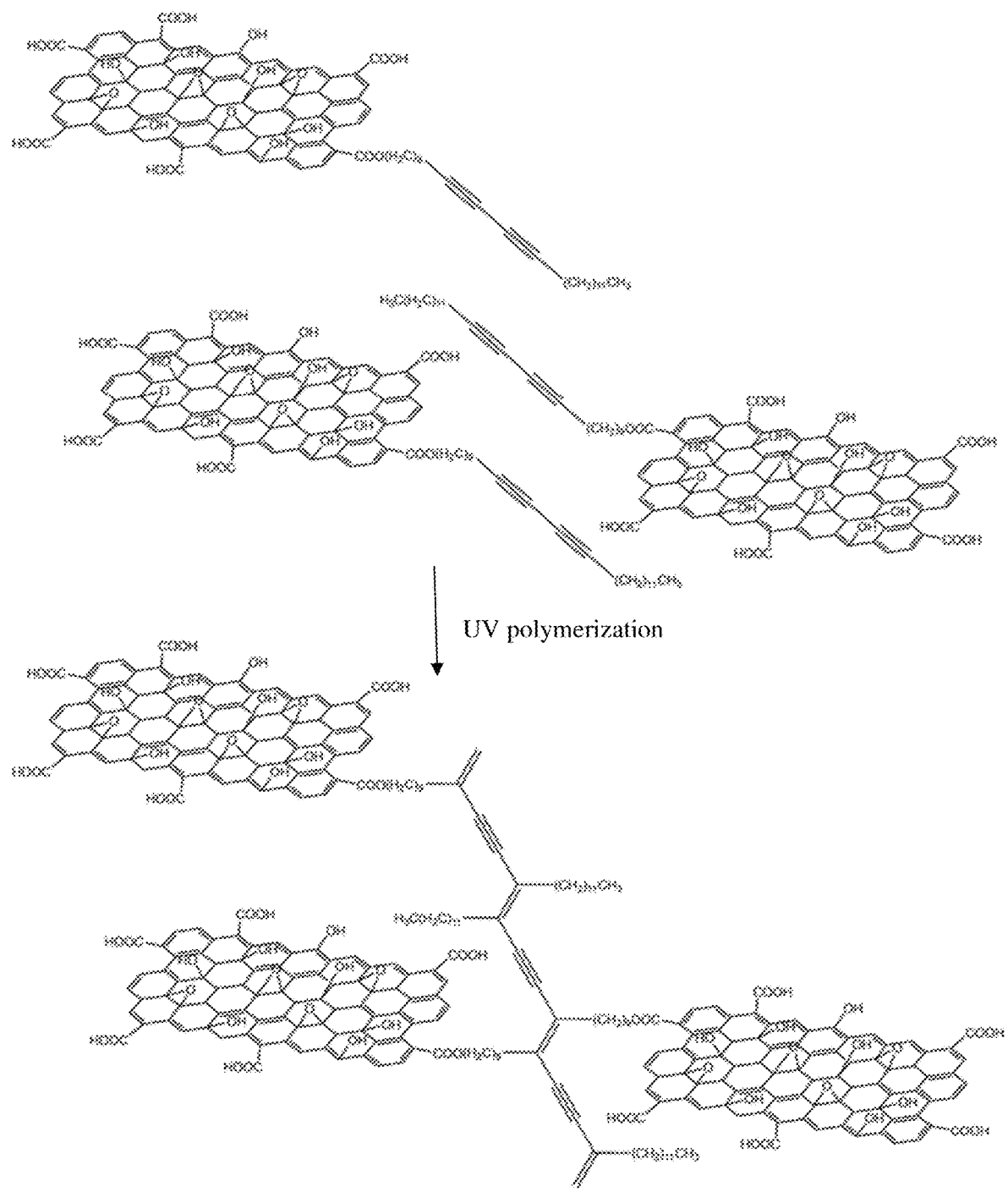
FIG. 5(c) An example to illustrate one mechanism with which neighboring chemically functionalized graphene sheets are chemically interconnected together.

In yet another approach, graphene oxide sheets are immersed in a solution of 10,12-pentacosadiyn-1-ol [PCO, $CH_3(CH_2)_{11}C{\equiv}C{-}C{\equiv}C(CH_2)_8CH_2OH$] to form a graphene dispersion. The dispersion is then coated on a PET substrate under a high shear stress and high shear rate condition (shear rate from 0.1 to $10^5$ sec$^{-1}$, preferably from $10^2$ to $10^4$ sec$^{-1}$) to form a filament comprising highly oriented GO sheets lightly coated with PCO. As illustrated in Scheme 3, FIG. 5(C), the filament, after drying, may be exposed to UV light to provide a fiber of PCO-GO sheets in which the diacetylene groups of PCO have reacted by 1,4-addition polymerization. Subsequently, the fiber may be immersed in hydroiodic acid (HI) to reduce the PCO-GO sheets into graphene-PCO sheets. Then, the fiber of graphene-PCO sheets is immersed successively into 1-pyrenebutyric acid N-hydroxysuccinimide ester (PSE) and 1-aminopyrene (AP) solutions, thereby providing a fiber of interconnected graphene sheet in which the PSE and AP have bonded through π-π interactions with neighboring graphene sheets and reacted to provide PSE-AP covalent bonds. The ratio of π-π interactions through PSE-AP derived bonding and covalent bonding resulting from PCO can be optimized by adjusting the immersion times in the respective solutions.

The above discussion indicates that chemical functionalization plays at least two roles in the instant invention. One is to make a graphene material (e.g. pristine graphene, GO, RGO, graphene fluoride, etc.) dispersible in a desired liquid medium so that we can produce a graphene dispersion for subsequent production of long or continuous graphene fibers. A second role is to create bridging functional groups that enable chemical reactions, merging, and/or cross-linking between functionalized graphene sheets to produce graphene fibers consisting of essentially interconnected graphene sheets to impart high strength, high elasticity, high electric conductivity and high thermal conductivity.

Step (b) includes dispensing and depositing at least a continuous or long filament of the graphene dispersion onto a supporting substrate. This can be accomplished by using casting, slot-die coating, comma coating, reverse-roll coating, ultrasonic spraying, or pressure air-assisted spraying, etc.). In these operations, the dispensing and depositing procedure preferably includes using mechanical shear stress to align or orient the chemically functionalized graphene sheets along the filament axis direction. In certain embodiments, the coating head can be operated to create a high shear stress and high strain rate between the dispensed graphene dispersion and the supporting substrate that undergoes a relative motion relative to the coating head.

This mechanical stress/strain condition enables all the constituent graphene sheets or graphene domains to be aligned along the graphene fiber axis direction and be substantially parallel to one another. More significantly, the graphene sheets are closely packed to facilitate chemical reactions or cross-linking (interconnection) between graphene sheets. In other words, not only the graphene planes in a particular domain are parallel to one another, they are also parallel to the graphene planes in the adjacent domain. The crystallographic c-axes of these two sets of graphene planes are pointing along substantially identical directions. As such, the domains do not follow a helical or twisting pattern. Thus, the continuous graphene fiber contains a first graphene domain containing bonded graphene sheets parallel to one another and having a first crystallographic c-axis, and a second graphene domain containing bonded graphene sheets parallel to one another and having a second crystallographic c-axis wherein the first crystallographic c-axis and the second crystallographic c-axis are inclined with respect to each other at an angle less than 10 degrees (mostly less than 5% and even more often less than 1 degree).

Figure 4A:
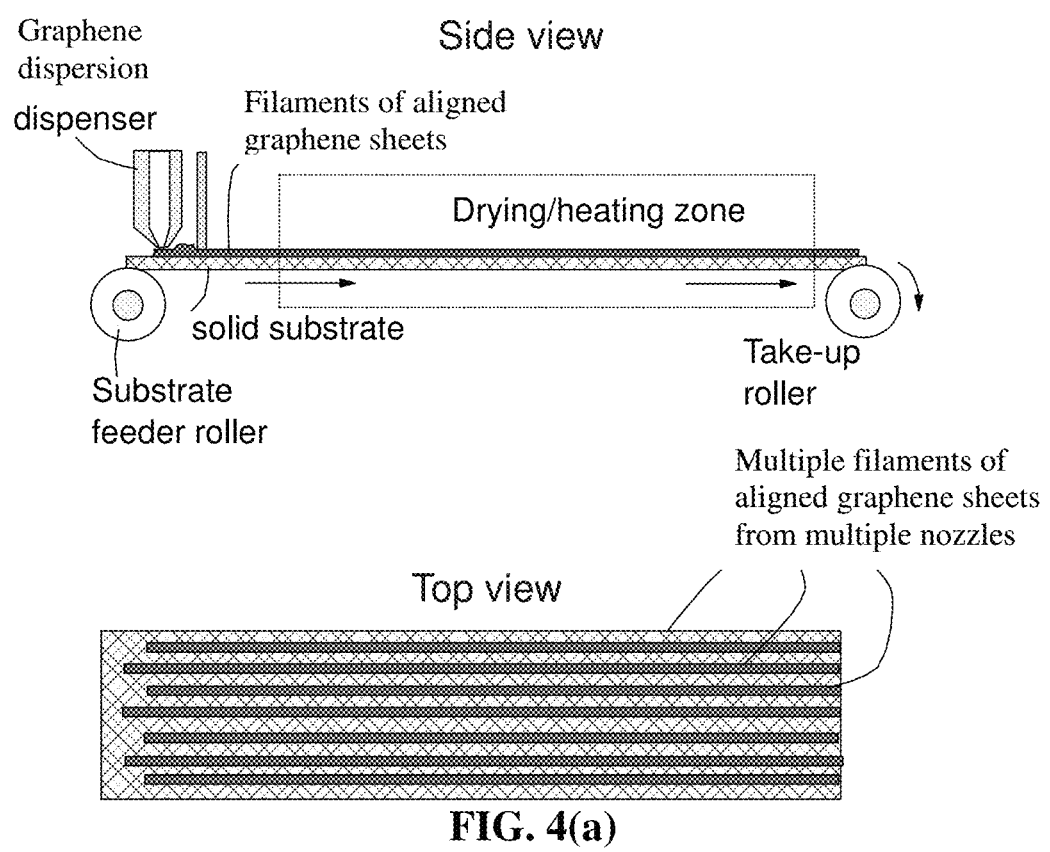
FIG. 4(a) Schematic diagram illustrating a process of producing multiple continuous graphene fibers from functionalized graphene sheets dispensed through multiple nozzles under the influence of a shear stress and high strain rate.
Figure 4B:
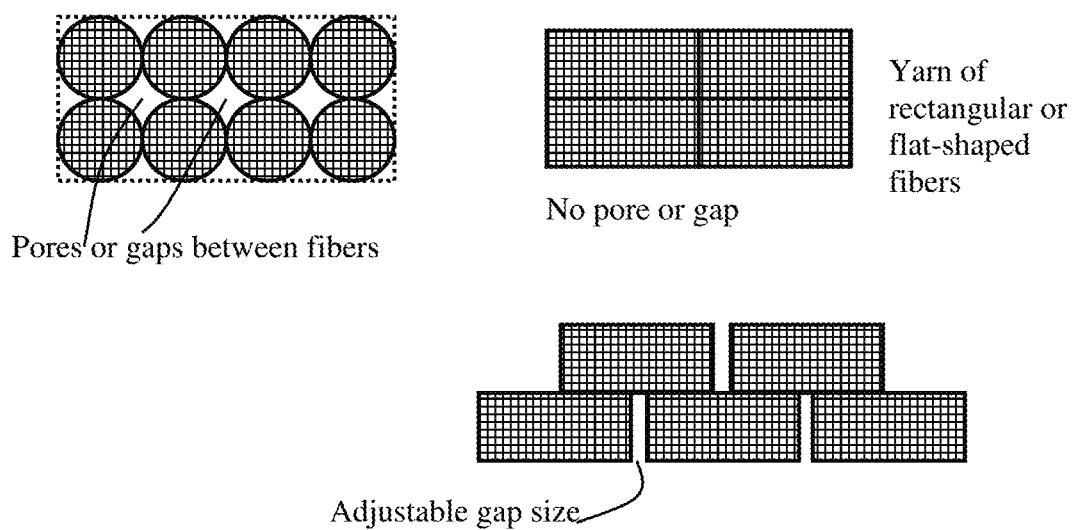
FIG. 4(b) Two types of fiber cross-sections (circular and rectangular) forming two types of yarns with different packing factors.

As schematically illustrated in FIG. 4(a), multiple dispensing devices or one dispensing device with multiple nozzles may be used to dispense multiple filaments of graphene sheets onto a moving substrate in a continuous manner. A feeder roller provides a solid substrate (e.g. plastic film) that moves from the left side to the right side of FIG. 4(a) and is collected on a take-up roller. A drying/heating zone may be implemented to remove most of the liquid component (e.g. water or organic solvent) from the filaments prior to being collected on the winding roller. Multiple filaments may be laid onto the substrate concurrently.

Step (c) entails using heat, electromagnetic waves (e.g. radio frequency waves or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets to form the long graphene fiber. The chemical functional groups and the chemical reaction conditions (including graphene sheet orientation, close-packing, etc.) enable the formation of a long graphene fiber comprising chemically functionalized graphene sheets that are chemically bonded with one another having an inter-planar spacing $d_{002}$ from 0.36 nm to 1.5 nm as determined by X-ray diffraction and a non-carbon element content of 0.1% to 40% by weight. The functionalized graphene sheets are substantially parallel to one another and parallel to the fiber axis direction and the fiber contains no core-shell structure, have no helically arranged graphene domains, and have a length no less than 0.5 cm and a physical density from 1.5 to 2.25 g/cm$^3$.

In certain embodiments, chemical functionalization of graphene sheets is allowed to occur after the graphene fiber is formed. Thus, the invention also provides a process for producing a graphene-based continuous or long fiber (or multiple fibers of this type, yarns, and fabric) from initially un-functionalized graphene sheets. In certain embodiments, the process comprises:
  (a) preparing a graphene dispersion having graphene sheets dispersed in a fluid medium (e.g., water or an organic solvent);
  (b) dispensing and depositing at least a continuous or long filament of the graphene dispersion onto a supporting substrate, wherein the dispensing and depositing procedure includes mechanical shear stress-induced alignment of the graphene sheets along a filament axis direction, and partially or completely removing the fluid medium from the filament to form a continuous or long fiber comprising aligned graphene sheets;
  (c) bringing the continuous or long fiber(s) in contact with a chemical functionalizing agent so as to produce a continuous or long fiber of chemically functionalized graphene sheets having chemical functional groups attached thereto and a non-carbon element content (e.g. H, O, N, B, P, Cl, F, Br, I, S, etc.) of 0.1% to 47% by weight;
  (d) using heat (typically from 0 to 200° C.), electromagnetic waves (e.g. radio frequency waves, or microwaves), UV light, high-energy radiation (e.g. electron beam, Gamma ray, or X-ray), or a combination thereof to induce chemical reactions or chemical bonding between chemical functional groups attached to adjacent chemically functionalized graphene sheets to form said long graphene fiber, wherein said long graphene fiber comprises chemically functionalized graphene sheets that are chemically bonded with one another having an inter-planar spacing $d_{002}$ from 0.36 nm to 1.5 nm as determined by X-ray diffraction and a non-carbon element content of 0.1% to 47% by weight and wherein said functionalized graphene sheets are substantially parallel to one another and parallel to a fiber axis direction and said fiber contains no core-shell structure, have no helically arranged graphene domains, and have a length no less than 0.5 cm and a physical density from 1.5 to 2.2 $g/cm^3$;
  (e) combining at least one such continuous or long graphene fiber with a plurality of the same type or different type(s) of fibers to prepare continuous or long fiber yarns; and
  (f) combining these fiber yarns and other fiber yarns (the same or different types) into a fabric.

In this process, graphene sheets are not functionalized initially. They are functionalized after the graphene sheets are made into a fiber.

A wide variety of chemical functional groups can be chemically attached to the edges and/or planes of graphene sheets to enable interconnection between graphene sheets. The chemically functionalized graphene sheets in the long fiber may contain a chemical functional group selected from the group consisting of alkyl or aryl silane, alkyl or aralkyl group, hydroxyl group, carboxyl group, carboxylic group, amine group, sulfonate group (—$SO_3H$), aldehydic group, quinoidal, fluorocarbon, derivatives thereof, and combinations thereof.

The chemically functionalized graphene sheets may contain a chemical functional group selected from a derivative of an azide compound selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R=any one of the following groups,

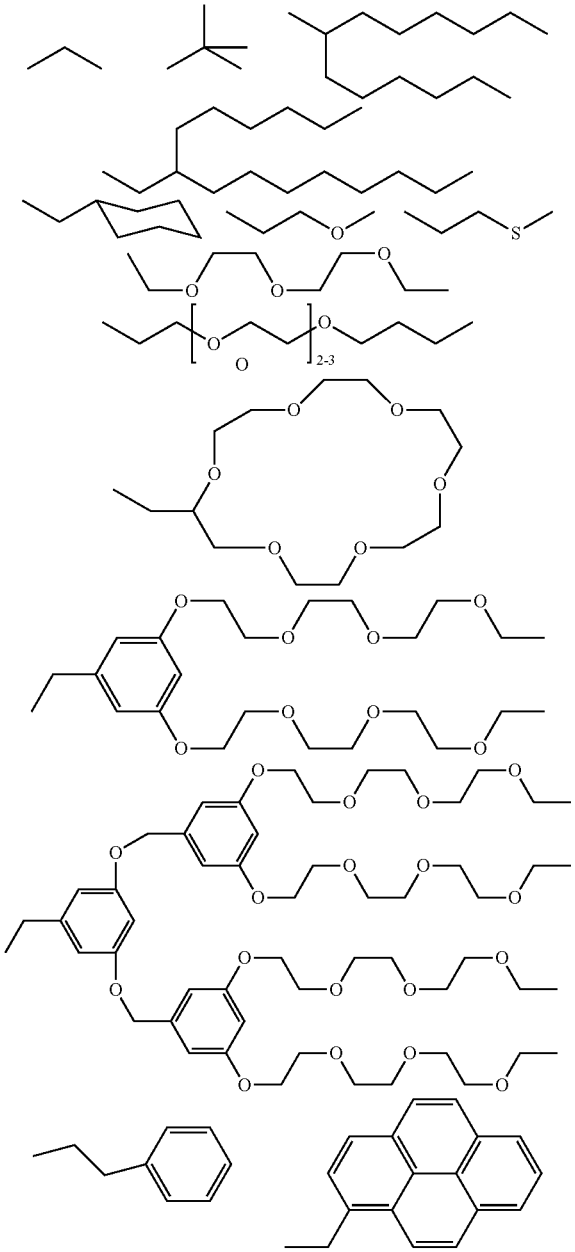

and combinations thereof.

The chemically functionalized graphene sheets may contain a chemical functional group selected from an oxygenated group consisting of hydroxyl, peroxide, ether, keto, aldehyde, and combinations thereof.

The chemically functionalized graphene sheets may contain a chemical functional group selected from the group consisting of —$SO_3H$, —COOH, —$NH_2$, —OH, —R'CHOH, —CHO, —CN, —COCl, halide, —COSH, —SH, —COOR', —SR', —$SiR'_3$, —Si(—O—$SiR'_2$—)OR', —R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, derivatives thereof, and combinations thereof.

The chemically functionalized graphene sheets may contain a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, derivatives thereof, and combinations thereof.

The chemically functionalized graphene sheets may contain a chemical functional group selected from OY, NHY, O=C—OY, P=C—NR'Y, O=C—SY, O=C—Y, —CR'1-OY, N'Y or C'Y, a derivative thereof, or a combination thereof, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N$^+$(R)$_3$X$^-$, R'SiR'$_3$, R'Si(—OR'—)$_y$R'$_{3-y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

The chemically functionalized graphene sheets may contain a chemical functional group selected from the group consisting of 10,12-pentacosadiyn-1-ol, 1-pyrenebutyric acid N-hydroxysuccinimide ester, 1-aminopyrene, derivatives thereof, and combinations thereof.

The process may further comprise a step (d) of compressing the graphene fibers after formation to increase the physical density of the fiber and further align the constituent graphene sheets.

The process may further comprise a step of reducing the non-carbon content to less than 20% (preferably less than 5%) by weight using chemical, thermal, UV, or radiation-induced reduction means. For instance, one may optionally subject the long or continuous fiber to a heat treatment at a temperature typically 200-700° C. to thermally reduce the non-carbon content.

The functionalized graphene sheet-derived graphene fibers and related processes have the following characteristics and advantages:

(1) The presently invented graphene-based fiber is an integrated graphene phase composed of chemically interconnected graphene sheets that are essentially oriented parallel to one another. The graphene sheets are also closely packed to exhibit a high physical density. This conclusion was drawn after an extensive investigation using a combination of SEM, TEM, selected area diffraction (with a TEM), X-ray diffraction, atomic force microscopy (AFM), Raman spectroscopy, and FTIR.

(2) The yarn-like graphene fibers prepared by the prior art processes (e.g. spinning-coagulation) are a simple, unbonded aggregate/stack of multiple discrete platelets or sheets of graphene, GO, or RGO that are just mechanically fastened together. In contrast, the present graphene fiber of the present invention is a fully integrated monolith containing essentially no discrete sheets or platelets. All the graphene sheets are chemically interconnected.

(3) With these conventional processes, the constituent graphene sheets of the resulting yarn-like fibers remain as discrete flakes/sheets/platelets that can be easily discerned or clearly observed. In a cross-sectional view under a SEM (e.g. FIG. 2(c)), these discrete sheets are relatively random in orientation and have many pores between these discrete sheets.

(4) In contrast, the preparation of the presently invented graphene fiber structure involves chemically functionalizing graphene sheets so that they that possess highly reactive functional groups (e.g. —OH, —NH$_2$, and —COOH) at the edge and on graphene planes. When being heated or exposed to UV or high-energy radiation, these highly reactive functional groups from adjacent graphene sheets react and chemically join with one another in lateral directions along graphene planes (in an edge-to-edge manner) and between graphene planes.

Not wishing to be bound by the theory, we offer another plausible chemical linking mechanism as illustrated in FIG. 3(d), where only 2 aligned functionalized graphene sheets are shown as an example, although a large number of graphene sheets can be chemically linked together to form a graphene fiber. Further, chemical linking could also occur face-to-face or face-to-edge, not just edge-to-edge. These linking and merging reactions proceed in such a manner that the graphene sheets can be chemically merged, linked, and integrated into one single entity or monolith.

Due to these unique chemical compositions (including non-carbon content), morphology, crystal structure (including inter-graphene spacing), and microstructural features (e.g. defects, chemical bonding and no gap between graphene sheets, nearly perfectly aligned graphene sheets, and no interruptions in graphene planes), the graphene-based long or continuous fiber has a unique combination of outstanding thermal conductivity, electrical conductivity, tensile strength, and Young's modulus. No prior art continuous fiber of any material type even comes close to these combined properties. Again, specifically and most significantly, these chemically functionalized graphene sheets are capable of chemically bonding, linking, or merging with one another and becoming integrated into highly parallel and interconnected graphene sheets (e.g. FIG. 3(a)).

It may be noted that the degree of graphene sheet orientation in a continuous or long fiber can be measured using a well-known method based on the full width at half maximum (FWHM) of X-ray scattering intensity as a function of the azimuthal angle. The degree of orientation may be calculated from the following equation: $\Phi = 100\% \times (180 - FWHM)/180$. It is of interest to note that the use of comma coating for graphene dispersion deposition typically results in a continuous and long graphene fiber having a degree of orientation of approximately from 87% to 93%. The slot-die coating procedure for preparing graphene fibers having a flat-shape cross-section typically leads to a degree of orientation of approximately from 90% to 96% and a reverse-roll coating procedure leads to a degree of graphene sheet orientation from 93% to 99%.

Due to these compositional and structural features, the produced long or continuous fiber has a thermal conductivity from 200 to 1,600 W/mK, or an electrical conductivity from 600 to 15,000 S/cm; more preferably and typically having a thermal conductivity of at least 350 W/mK or an electrical conductivity no less than 1,000 S/cm; further more preferably and typically having a thermal conductivity of at least 600 W/mK or an electrical conductivity no less than 2,500 S/cm; still further preferably and typically having a thermal conductivity of at least 1,000 W/mK or an electrical conductivity no less than 5,000 S/cm; and most preferably having a thermal conductivity of at least 1,200 W/mK, or an electrical conductivity no less than 8,000 S/cm. The long or continuous fiber typically and preferably has a Young's modulus from 20 GPa to 300 GPa (more typically from 30 GPa to 150 GPa), or a tensile strength from 1.0 GPa to 5.0 GPa (more typically from 1.2 GPa to 3.0 GPa).

The following examples are used to illustrate some specific details about the best modes of practicing the instant invention and should not be construed as limiting the scope of the invention.

Example 1: Preparation of Single-Layer Graphene Sheets from Mesocarbon Microbeads (MCMBs)

Mesocarbon microbeads (MCMBs) were supplied from China Steel Chemical Co., Kaohsiung, Taiwan. This material has a density of about 2.24 g/cm$^3$ with a median particle size of about 16 µm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours. GO sheets were suspended in water. The GO suspension was formed into small filaments on a glass surface.

Example 2: Preparation of Pristine Graphene Sheets (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene fiber having a higher thermal conductivity. Pristine graphene sheets were produced by using the direct ultrasonication or liquid-phase production process.

In a typical procedure, five grams of graphite flakes, ground to approximately 20 µm or less in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

The pristine graphene sheets were immersed into a 10 mM acetone solution of BPO for 30 min and were then taken out drying naturally in air. The heat-initiated chemical reaction to functionalize graphene sheets was conducted at 80° C. in a high-pressure stainless steel container filled with pure nitrogen. Subsequently, the samples were rinsed thoroughly in acetone to remove BPO residues for subsequent Raman characterization. As the reaction time increased, the characteristic disorder-induced D band around 1330 cm$^{-1}$ emerged and gradually became the most prominent feature of the Raman spectra. The D-band is originated from the $A_{1g}$ mode breathing vibrations of six-membered sp$^2$ carbon rings, and becomes Raman active after neighboring sp$^2$ carbon atoms are converted to sp$^3$ hybridization. In addition, the double resonance 2D band around 2670 cm$^{-1}$ became significantly weakened, while the G band around 1580 cm$^{-1}$ was broadened due to the presence of a defect-induced D' shoulder peak at 1620 cm$^{-1}$. These observations suggest that covalent C—C bonds were formed and thus a degree of structural disorder was generated by the transformation from sp$^2$ to sp$^3$ configuration due to reaction with BPO.

The functionalized graphene sheets were re-dispersed in water to produce a graphene dispersion. The dispersion was then made into multiple filaments.

Example 3: Preparation of Graphene Oxide (GO) Suspension from Natural Graphite

Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 µm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

By dispensing and coating the GO suspension to form multiple filaments on a polyethylene terephthalate (PET) film in a slurry coater and removing the liquid medium from the coated filaments obtained fibers of dried graphene oxide. Several GO fibers were then immersed in a solution of 10,12-pentacosadiyn-1-ol [$CH_3(CH_2)_{11}C\equiv C-C\equiv C(CH_2)_8 CH_2OH$], or PCO, allowing PCO to permeate into GO fibers and contacting therewith. As illustrated in Scheme 3, FIG. 5(C), the fibers, after drying, were exposed to UV light to provide fibers of PCO-GO sheets in which the diacetylene groups of PCO react by 1,4-addition polymerization. Subsequently, the fibers were immersed in hydroiodic acid (HI) to reduce the PCO-GO sheets in the fiber into graphene-PCO sheets. Then, the fibers of graphene-PCO sheets is immersed successively into 1-pyrenebutyric acid N-hydroxysuccinimide ester (PSE) and 1-aminopyrene (AP) solutions, thereby providing fibers of interconnected rGO sheets in which the PSE and AP have bonded through π-π interactions with neighboring rGO sheets and react to provide PSE-AP covalent bonds.

Multiple graphene fibers produced were made into yarns and fabrics. Some of the fabrics, the yarns, or the continuous/long graphene fibers were made to have a cross-section that is rectangular or flat-shaped. Preferably, the graphene fibers were produced to have a width-to-thickness ratio from 5 to 200. Some of the fabrics had a thickness from 100 nm to 1 µm, and some from 1 µm to 100 µm. It may be noted that conventional continuous graphitic fiber yarns cannot be made into a fabric having a thickness less than 10 µm or less than 1 µm.

Example 4: Preparation of Graphene Fibers from Graphene Fluoride

Several processes have been used by us to produce graphene fluoride, but only one process is herein described. In a typical procedure, highly exfoliated graphite (HEG) was prepared from intercalated compound $C_2F.xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication times ensured better stability. Upon extrusion to form filaments on a glass surface with the solvent removed, the dispersion became brownish filaments formed on the glass surface.

Example 5: Preparation of Graphene Fibers from Nitrogenated Graphene

Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and 1/2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. The resulting suspensions were then extruded and made into filaments. Upon drying, the resulting nitrogenated graphene fibers exhibit physical densities from 1.75 to 2.05 $g/cm^3$.

Example 6: Chemical Functionalization of Graphene Fluoride and Nitrogenated Graphene Specimens of graphene fluoride fibers and nitrogenated graphene fibers prepared earlier were subjected to functionalization by bringing these specimens in chemical contact with chemical compounds such as carboxylic acids, azide compound (2-azidoethanol), alkyl silane, diethylenetriamine (DETA), and chemical species containing hydroxyl group, carboxyl group, amine group, and sulfonate group ($-SO_3H$) in a liquid or solution form.

Scanning electron microscopy (SEM), transmission electron microscopy (TEM) pictures of lattice imaging of the graphene filament, as well as selected-area electron diffraction (SAD), bright field (BF), and dark-field (DF) images were also conducted to characterize the structure of graphene fibers.

Figure 2A:
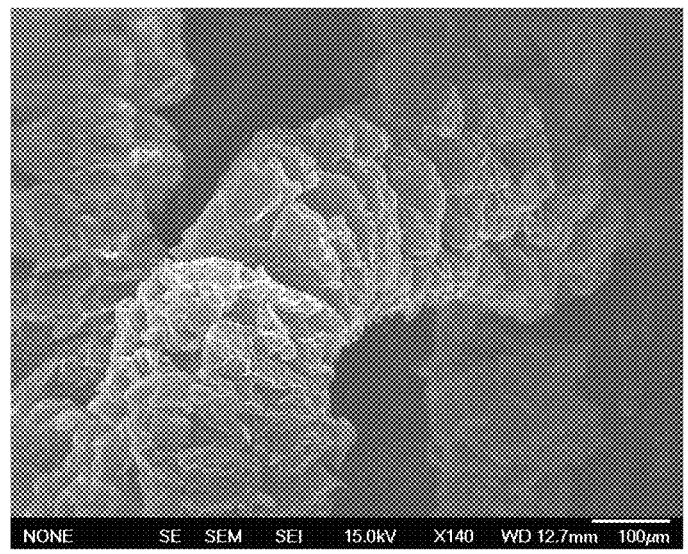
FIG. 2(a) A SEM image of a graphite worm sample after thermal exfoliation of graphite intercalation compounds (GICs) or graphite oxide powders.
Figure 2B:
FIG. 2(b) An SEM image of a cross-section of a flexible graphite foil, showing many graphite flakes with orientations not parallel to the flexible graphite foil surface and also showing many defects, kinked or folded flakes.
Figure 2C:
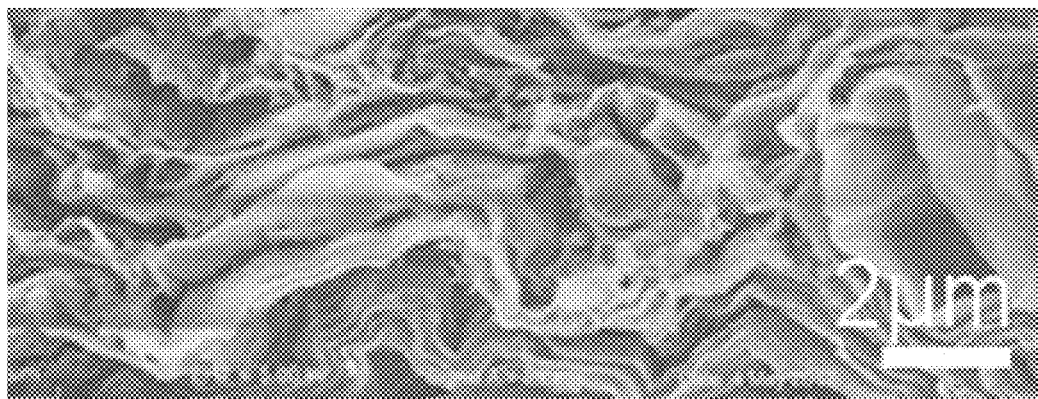
FIG. 2(c) SEM images of an elongated section of prior art graphene fibers produced by solution spinning and liquid coagulation, showing many graphene sheets with orientations not parallel to the fiber axis direction and also showing many defects, pores, kinked or folded graphene sheets.
Figure 2D:
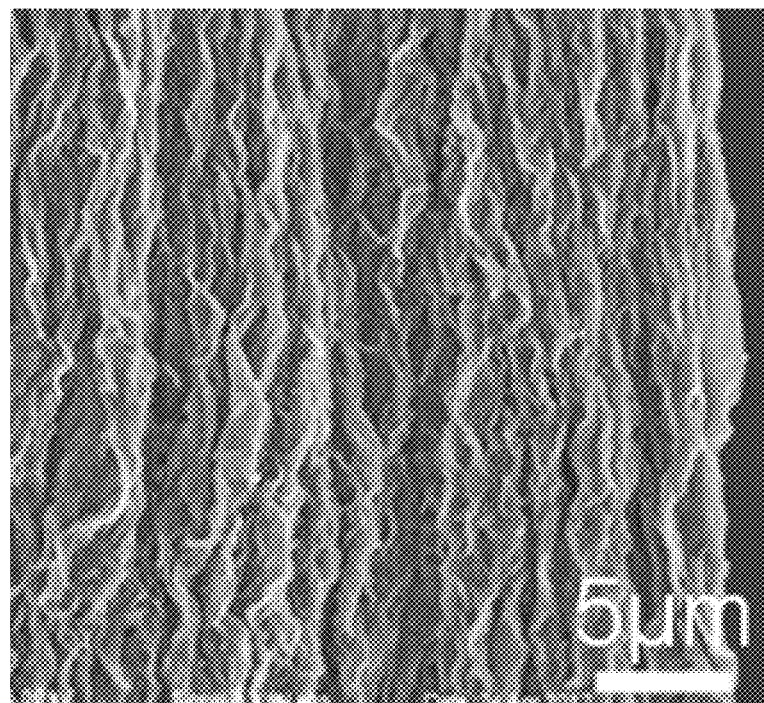
FIG. 2(d) SEM images of another elongated section of prior art graphene fibers produced by solution spinning and liquid coagulation.
Figure 3A:
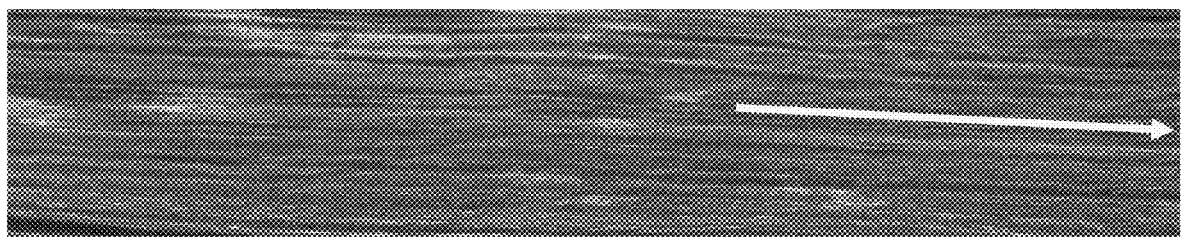
FIG. 3(a) A SEM image of a long graphene fiber produced from chemically functionalized GO sheets.
Figure 3A:
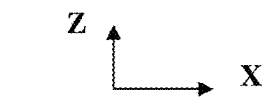
Figure 3B:
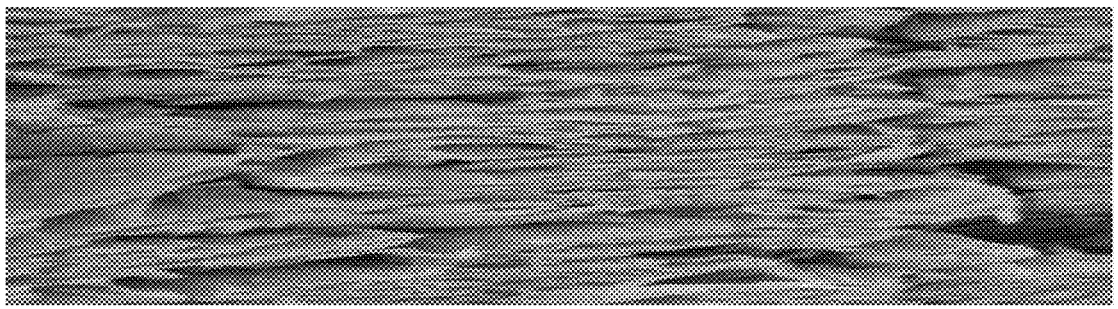
FIG. 3(b) A SEM image of a cross-section of a conventional graphene paper/film prepared from discrete graphene sheets/platelets using a paper-making process (e.g. vacuum-assisted filtration). The image shows many discrete graphene sheets being folded or interrupted (not integrated), with orientations not parallel to the film/paper surface and having many defects or imperfections.
Figure 3B:
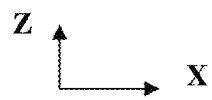
Figure 3C:
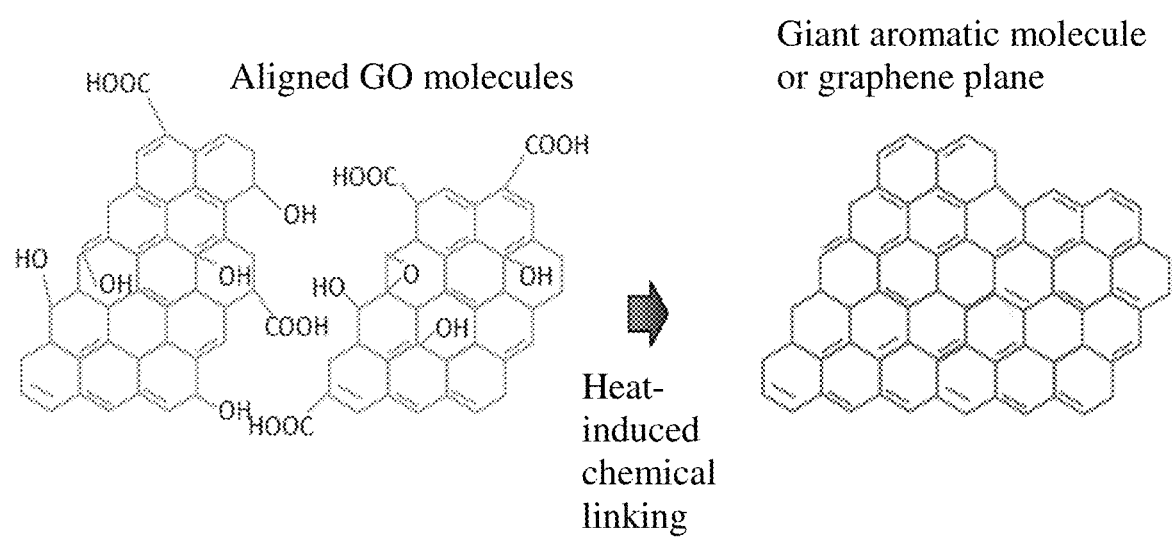
FIG. 3(c) One plausible chemical linking mechanism (only 2 GO sheets are shown as an example; a large number of GO sheets can be chemically linked together to form a long graphene fiber).

A close scrutiny and comparison of FIG. 3(a) indicates that the graphene planes in a graphene long fiber are substantially oriented parallel to one another; but this is not the case for coagulation-derived graphene fibers (FIG. 2(c)). The inclination angles between two identifiable layers in the graphene fiber are mostly less than 5 degrees. In contrast, there are so many folded graphene sheets, kinks, pores, and mis-orientations in coagulation-derived graphene fibers.

Examples 7: Electrical and Thermal Conductivity Measurements of Various Graphene Fibers Four-point probe tests were conducted on chemically functionalized graphene-derived fibers and coagulation-derived graphene fibers to measure their electrical conductivity. Their axial thermal conductivity was measured using a laser flash method (Netzsch Thermal Diffusivity Device). In order to obtain axial thermal conductivity, fibers of approximately 10 mm in width were stacked, laminated, and sectioned transverse to the length of the fibers prior to measurement.

Due to the unique compositional and structural features, the presently invented long or continuous fibers have a thermal conductivity typically from 200 to 1,600 W/mK. The electrical conductivity is typically from 600 to 15,000 S/cm. These fibers have a thermal conductivity more typically from 350 to 1,500 W/mK or an electrical conductivity more typically from 1,000 to 12,000 S/cm.

Examples 8: Tensile Strength of Various Graphene Fibers

Figure 6:
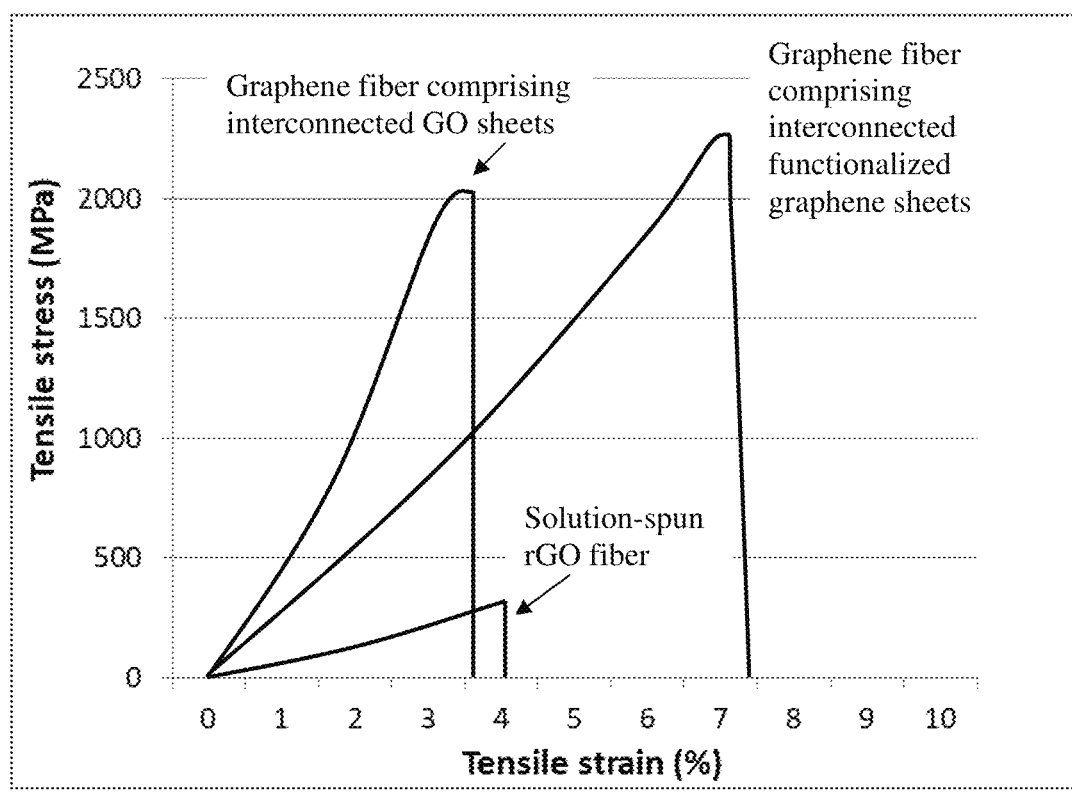
FIG. 6 Tensile strength and Young's modulus of three graphene fibers: one derived from highly oriented chemically functionalized graphene sheets, one derived from highly oriented graphene oxide sheets, and a conventional coagulation-based reduced graphene oxide fiber.

A universal testing machine was used to determine the tensile strength and Young's modulus of various graphene fibers. Representative results on tensile strength and Young's modulus for two types of presently invented graphene-based continuous fibers and one conventional reduced graphene oxide fiber are shown in FIG. 6. This specimen of a graphene fiber produced from chemically functionalized graphene sheets exhibits a tensile strength of 2.26 GPa and a Young's modulus of 31 GPa. The graphene fiber produced from oriented GO sheets exhibits a tensile strength of 2.0 GPa and Young's modulus of 60 GPa. Most of the presently invented graphene fibers have a Young's modulus from 20 GPa to 300 GPa (more typically from 30 GPa to 150 GPa), or a tensile strength from 1.0 GPa to 5.0 GPa (more typically from 1.2 GPa to 3.0 GPa).

We claim:

1. A process for producing a fabric containing a graphene-based continuous or long fiber made from graphene sheets, said process comprising:
   (a) preparing a graphene dispersion having discrete unfunctionalized graphene sheets dispersed in a liquid medium;
   (b) dispensing and depositing at least a continuous or long filament of said graphene dispersion onto a supporting substrate, wherein said dispensing and depositing procedure includes mechanical shear stress-induced alignment of said unfunctionalized graphene sheets along a filament axis direction, and partially or completely removing said liquid medium from said filament to form a continuous or long fiber comprising aligned unfunctionalized graphene sheets;
   (c) bringing said continuous or long fiber in contact with a chemical functionalizing agent to functionalize said continuous or long fiber so as to produce a continuous or long fiber of chemically functionalized graphene sheets having chemical functional groups attached thereto and a non-carbon element content of 0.1% to 47% by weight;
   (d) using heat, electromagnetic waves, UV light, high-energy radiation, or a combination thereof to induce chemical reactions or chemical bonding between chemical functional groups attached to adjacent chemically functionalized graphene sheets to form said long graphene fiber, wherein said continuous or long graphene fiber comprises chemically functionalized graphene sheets that are chemically bonded with one another having an inter-planar spacing $d_{002}$ from 0.36 nm to 1.5 nm as determined by X-ray diffraction and a non-carbon element content of 0.1% to 47% by weight and wherein said functionalized graphene sheets are substantially parallel to one another and parallel to a fiber axis direction and said fiber contains no core-shell structure, have no helically arranged graphene domains, and have a length no less than 0.5 cm and a physical density from 1.5 to 2.25 g/cm³;

(e) combining said at least one continuous or long graphene fiber with a plurality of fibers, the same type as or different than said graphene fiber, to form at least one continuous or long fiber yarn; and (f) combining said at least one continuous or long fiber yarn and a plurality of fiber yarns, the same type as or different than said at least one continuous or long fiber yarn, to form said fabric;

wherein said continuous or long fiber has a thermal conductivity of at least 1,000 W/mK or an electrical conductivity no less than 2,500 S/cm.

2. The process of claim 1, further comprising a step of compressing said continuous or long fiber to increase a degree of graphene sheet orientation and physical density, and to improve contact between chemically functionalized graphene sheets.

3. The process of claim 1, wherein said chemically functionalized graphene sheets comprise a chemical functional group selected from the group consisting of hydroxyl, peroxide, ether, keto, aldehyde, alkyl or aryl silane, alkyl or aralkyl group, carboxyl group, carboxylic group, amine group, sulfonate group (—SO₃H), quinoidal, fluorocarbon, 10,12-pentacosadiyn-1-ol, hydroiodic acid, 1-pyrenebutyric acid N-hydroxysuccinimide ester, 1-aminopyrene, amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, derivatives thereof, and combinations thereof.

4. The process of claim 1, wherein said chemically functionalized graphene sheets comprise an azide derivative chemical functional group selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R-)-oxycarbonyl nitrenes, where R =any one of the following groups,

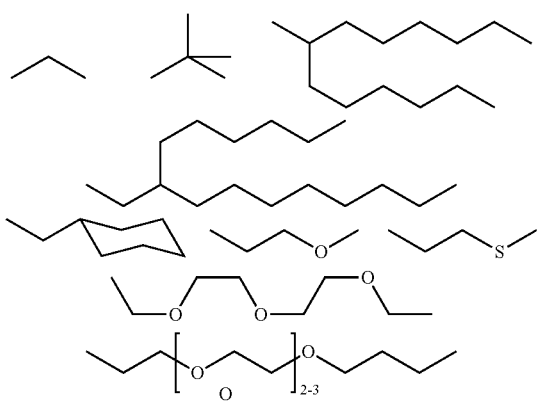

and combinations thereof.

5. The process of claim 1, wherein said chemically functionalized graphene sheets comprise a chemical functional group selected from the group consisting of —SO₃H, —COOH, —NH₂, —OH, —R'CHOH, —CHO, —CN, —COCl, halide, —COSH, —SH, —COOR', —SR', —SiR'₃, —Si(—OR'—)ᵧR'₃-ᵧ, —Si(—O—SiR'₂—)OR', —R", Li, AlR'₂, Hg—X, TlZ₂ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, derivatives thereof, and combinations thereof.

6. The process claim 1, wherein said chemically functionalized graphene sheets comprise a chemical functional group selected from the group consisting of OY, NHY, O=C—OY, P=C—NR'Y, O=C—SY, O=C—Y, —CR'1—OY, N'Y or C'Y, a derivative thereof, or a combination thereof, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'₂, R'SH, R'CHO, R'CN, R'X, R'N⁺(R')₃X⁻, R'SiR'₃, R'Si(—OR'—)ᵧR'₃-ᵧ, R'Si(—O—SiR'₂—)OR', R'—R", R'—N—CO, (—C₂H₄O—)wH, (—C₃H₆O—)wH, (—C₂H₄O)w—R', (—C₃H₆O)w—R', R', and w is an integer greater than one and less than 200.

7. The process of claim 1, wherein said continuous or long fiber has a thickness from 100 nm to 100 μm.

8. The process of claim 1, wherein said continuous or long fiber has a thermal conductivity of at least 1,200 W/mK or an electrical conductivity no less than 5,000 S/cm.

9. The process of claim 1, wherein said continuous or long fiber has a thermal conductivity of at least 1,200 W/mK, or an electrical conductivity no less than 8,000 S/cm.

10. The process of claim 1, wherein said continuous or long graphene fiber has a degree of orientation from 86% to 99%.

11. The process of claim 1, wherein said continuous or long fiber has a Young's modulus from 20 GPa to 300 GPa, or a tensile strength from 1.0 GPa to 5.0 GPa.

* * * * *